United States Patent
Sakurai

(10) Patent No.: US 12,183,239 B2
(45) Date of Patent: Dec. 31, 2024

(54) DISPLAY MEDIUM, PROCESSING DEVICE, AND PROCESSING PROGRAM

(71) Applicant: DWANGO Co., Ltd., Tokyo (JP)

(72) Inventor: Kaisei Sakurai, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 149 days.

(21) Appl. No.: 17/599,430

(22) PCT Filed: Oct. 23, 2019

(86) PCT No.: PCT/JP2019/041469
§ 371 (c)(1),
(2) Date: Sep. 28, 2021

(87) PCT Pub. No.: WO2020/194819
PCT Pub. Date: Jan. 10, 2020

(65) Prior Publication Data
US 2022/0180791 A1 Jun. 9, 2022

(30) Foreign Application Priority Data

Mar. 28, 2019 (JP) .................................. 2019-062393

(51) Int. Cl.
G09G 3/20 (2006.01)
G02F 1/23 (2006.01)
G06T 7/90 (2017.01)

(52) U.S. Cl.
CPC .............. *G09G 3/2003* (2013.01); *G02F 1/23* (2013.01); *G06T 7/90* (2017.01); *G09G 2320/0242* (2013.01); *G09G 2320/0666* (2013.01)

(58) Field of Classification Search
CPC ......... G09G 3/2003; G09G 2320/0242; G09G 2320/0666; G06T 7/90; G02F 1/23
See application file for complete search history.

(56) References Cited

U.S. PATENT DOCUMENTS

2010/0085517 A1    4/2010   Hong

FOREIGN PATENT DOCUMENTS

| JP | S60149488 A | | 8/1985 |
| JP | H0736400 | * | 2/1995 |
| JP | H0736400 A | | 2/1995 |
| JP | 6374625 B1 | | 8/2018 |
| WO | 2019150652 A1 | | 8/2019 |
| WO | 2020194819 A1 | | 10/2020 |

OTHER PUBLICATIONS

[English Translation] First Office Action for Chinese Patent Application No. 201980094273.8 dated Feb. 16, 2023, pp. all.
International Search Report and Written Opinion (English Translation only for ISR), mailed on Dec. 10, 2019, for PCT Application No. PCT/JP2019/041469, pp. all.

* cited by examiner

*Primary Examiner* — Roy P Rabindranath
(74) *Attorney, Agent, or Firm* — Dorsey & Whitney LLP

(57) ABSTRACT

A display medium 1 capable of displaying different sets of contents with light beams in a plurality of directions, includes a first layer L1 and a second layer L2 each having a color region to which a color is given. The light beams in the plurality of directions display a plurality of sets of contents corresponding to the plurality of directions, on a basis of parts of the first layer L1 and the second layer L2 through which the light beams pass.

8 Claims, 12 Drawing Sheets

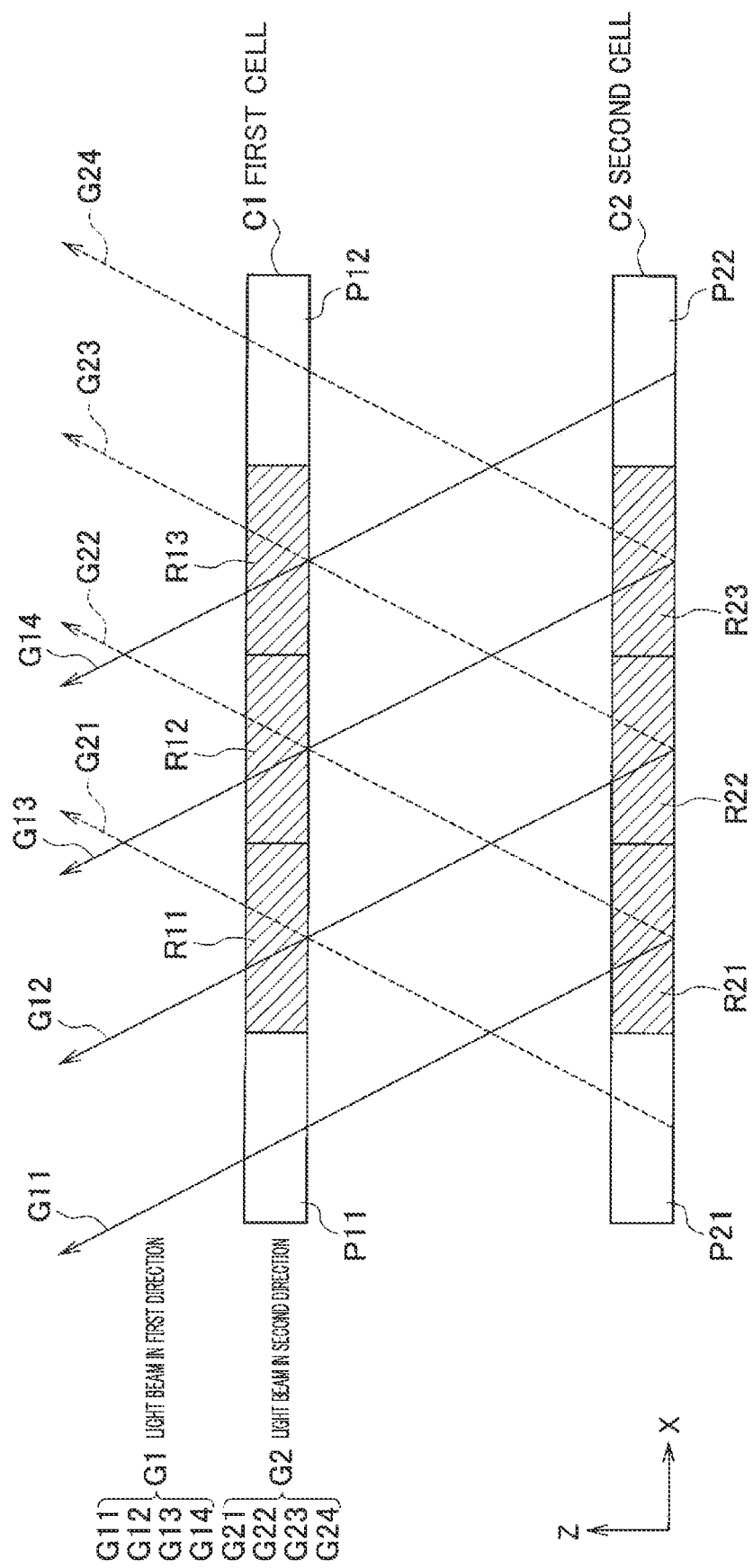

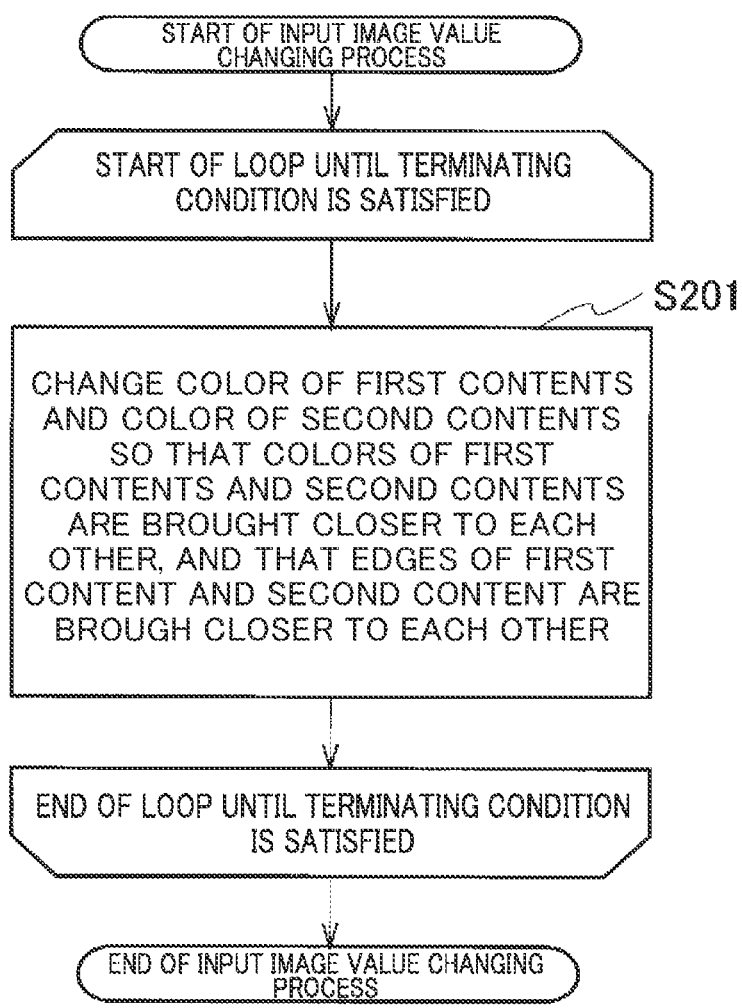

DISPLAY MEDIUM, PROCESSING DEVICE, AND PROCESSING PROGRAM

RELATED APPLICATIONS

This application is a 371 National Stage application claiming priority to International Application No. PCT/JP2019/041469, filed Oct. 23, 2019, which claims priority to Japanese Patent Application No. 2019-062393 filed on Mar. 28, 2019. The aforementioned applications are incorporated herein by references, in their entirety, for any purposes.

TECHNICAL FIELD

The present disclosure relates to a display medium capable of displaying different sets of contents with light beams in a plurality of directions, respectively, and relates to a processing device and a processing program configured to determine a color to be given a process-targeted cell of a layer in the display medium.

BACKGROUND ART

To achieve efficient displaying of information with a display medium, there is known a display medium capable of displaying a plurality of pieces of information (see Patent Document 1). According to the disclosure described in Patent Document 1, a plane member to which a color is applied is divided into sub-cells, and a protruding member is formed to allow visual recognition of colors of sub-cells.

CITATION LIST

Patent Documents

Patent Document 1: Japanese Patent No. 6374625

SUMMARY

Technical Problem

The display medium of Patent Document 1, however, enables displaying of a plurality of pieces of information by making a color given to the plane member partially visually recognizable, the amount of light may fall short and may be hard to see.

In view of the above, an object of the present disclosure is to provide a display medium, a processing device, and a processing program, for appropriately displaying a plurality of sets of contents.

Solution to the Problem

A first aspect of the present disclosure relates to a display medium capable of displaying different sets of contents with light beams in a plurality of directions. The display medium related to the first aspect of the present disclosure includes a first layer and a second layer each having a color region to which a color is given. The light beams in the plurality of directions display a plurality of sets of contents corresponding to the plurality of directions, on a basis of parts of the first layer and the second layer through which the light beams pass.

Preferably, the light beams in the plurality of directions include a light beam in a first direction and a light beam in a second direction; the first layer and the second layer are each made of a transparent member; the first layer and the second layer each includes the color region and a transparent region to which no color is given; the light beam in the first direction and the light beam in the second direction each passes through the color region of at least one of the first layer or the second layer; and at least one of the light beam in the first direction or the light beam in the second direction passes through the color region of the first layer and the color region of the second layer.

The first layer and the second layer may be virtually divided into a plurality of cells. Each of the cells may have the color region and the transparent region. The color region may be positioned away from edges of the cell.

Each of the first layer and the second layer may have a plurality of the color regions.

A second aspect of the present disclosure relates to a processing device configured to determine a color to be given to a process-targeted cell in a layer of a display medium. The processing device includes: a storage configured to store a color of first contents and a color of second contents, each of which color corresponding to a process-targeted cell; and a color determining unit configured to execute a first process and a second process to determine a color of process-targeted cells of the first layer and the second layer. The first process gives initial color values to a process-targeted cell of the second layer, and optimizes a color of a process-targeted cell in the first layer so that a difference between a color observed with a light beam in a first direction through the process-targeted cell and a color of the first contents is small, and that a difference between a color observed with a light beam in a second direction through the process-targeted cell and a color of the second contents is small. The second process gives a color optimized in the first process to the process-targeted cell of the first layer, and optimizes a color of a process-targeted cell in the second layer so that a difference between a color observed with the light beam in the first direction through the process-targeted cell and a color of the first contents is small, and that a difference between a color observed with the light beam in the second direction through the process-targeted cell and a color of the second contents is small.

The color determining unit may further give the color optimized in the second process to the process-targeted cell of the second layer and re-executes the first process, and gives the color optimized in the first process to the process-targeted cell of the first layer and re-executes the second process.

The processing device may further include an input image value changing unit configured to change the color of the first contents and the color of the second contents so that the color of the first contents and the color of the second contents are brought close to each other and an edge of the first contents and an edge of the second contents are brought close to each other, after processing by the color determining unit. The processing by the color determining unit may be further performed by using the color of the process-targeted cell for the first contents and the color of the process-targeted cell for the second contents, each of which color has been changed by the input image value changing unit.

A third aspect of the present disclosure relates to a processing program for achieving the functions of the processing device according to the second aspect of the present disclosure.

Advantages

The present disclosure provides a display medium, a processing device, and a processing program, for appropriately displaying a plurality of sets of contents.

BRIEF DESCRIPTION OF THE DRAWINGS

FIG. 6 is a view for explaining cells of a display medium according to a variation.

FIG. 13 is a flowchart for explaining processing of an input image value changing unit in the processing device according to the embodiment of the present disclosure.

DESCRIPTION OF EMBODIMENTS

Figure 1:
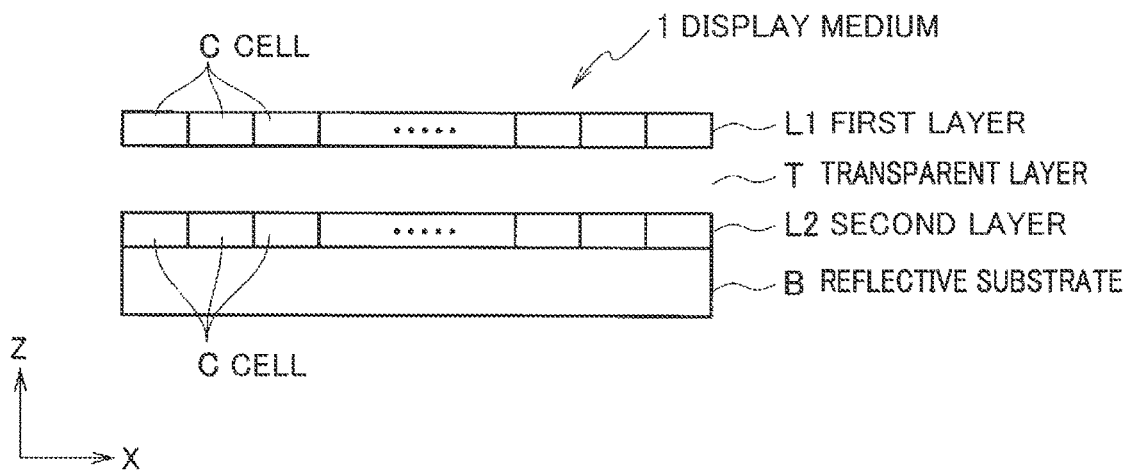
FIG. 1 is a side view of a display medium according to an embodiment of the present disclosure.

Next, embodiments of the present disclosure will be described with reference to the drawings. In the following description of the drawings, the same or similar reference characters are used to denote the same or similar elements.

(Display Medium)

Figure 2:
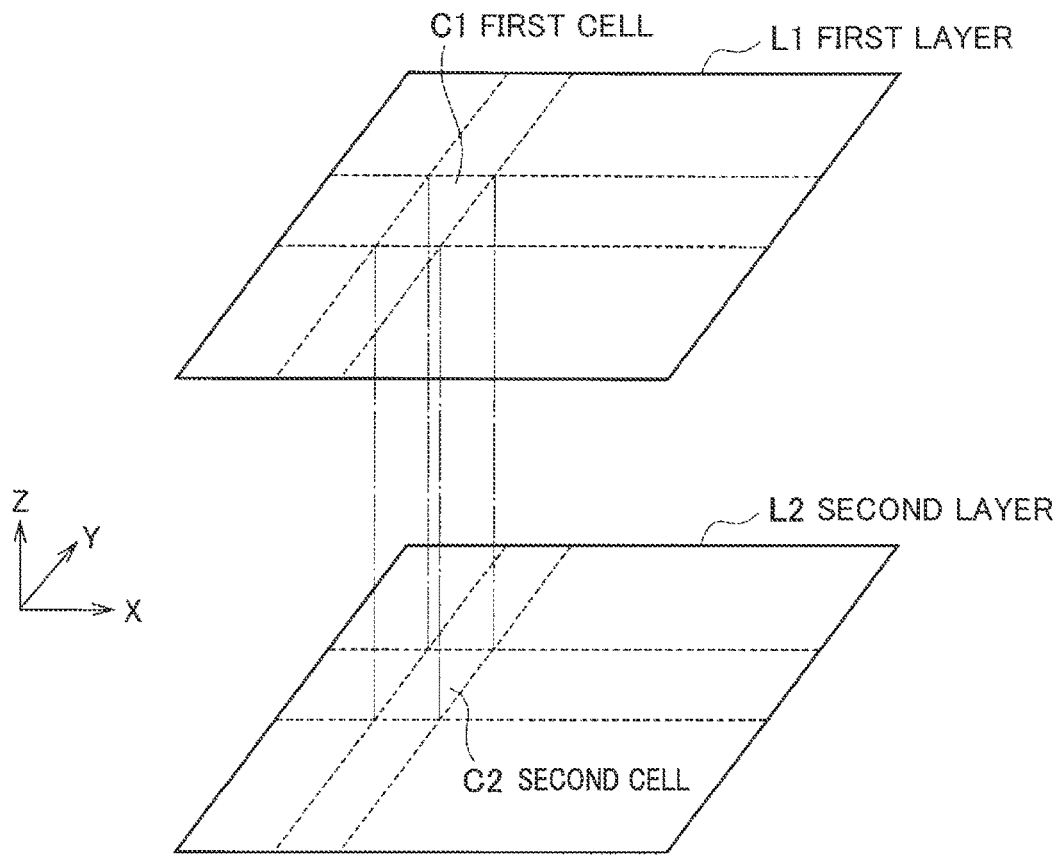
FIG. 2 is a perspective view of the display medium according to the embodiment of the present disclosure.

The display medium 1 according to the embodiment of the present disclosure displays different contents with light beams in a plurality of directions. As illustrated in FIG. 1, the display medium 1 includes a first layer L1 and a second layer L2. As shown in FIG. 1 and FIG. 2, the first layer L1 and the second layer L2 are formed in an XY plane and arranged parallel to the Z-axis direction. The display medium 1 displays a plurality of sets of contents corresponding to a plurality of directions, on the basis of parts of the first layer L1 and the second layer L2 through which each of light beams in the plurality of directions passes. The sets of contents is visually recognized at view points in positions where the light beams in the plurality of directions having passed through the first layer L1 and the second layer L2 enter. The display medium 1 displays a plurality of sets of contents by differentiating a combinations of colors observed with light beams having reached a view point through the first layer L1 and a combination of colors observed with light beams having reached a view point through the second layer L2. In the embodiment of the present disclosure, each view point is provided above the first layer L1 and the second layer L2 in the Z-axis direction.

In the embodiment of the present disclosure, the display medium 1 displays a plurality of sets of contents with a plurality of light beams. The embodiment of the present disclosure deals with a case in which the light beams in a plurality of directions include a light beam G1 in a first direction and a light beam G2 in a second direction. First contents is visually recognized at a view point where the light of the first direction having passed the first layer L1 and the second layer L2 enters. Second contents is visually recognized at a view point where the light of the second direction having passed the first layer L1 and the second layer L2 enters.

In the embodiment of the present disclosure, the light beams in predetermined directions used in displaying contents are emitted at least with respect to the first layer L1 and the second layer L2, from a direction facing the view point. In a case where a view point is above the first layer L1 and the second layer L2 in the Z-axis direction, the light beams may be emitted from a position below the first layer L1 and the second layer L2 in the Z-axis direction, and the position of the light source is not particularly limited. For example, light beams directed from a position lower than the second layer L2 toward a position higher in the Z-axis direction may be light beams having been emitted from a light source at an arbitrary position and having been reflected by a reflective substrate B, or light beams from a light source provided to the reflective substrate B.

Between the first layer L1 and the second layer L2, a transparent layer T is formed as shown in FIG. 1. Further, the reflective substrate B is arranged in an opposite direction, relative to the Z-axis direction, away from the transparent layer T, with respect to the second layer L2. The reflective substrate B, the second layer L2, the transparent layer T, and the first layer L1 are layered in this order in the Z-axis direction, thereby forming the display medium 1.

In one preferred embodiment, the transparent layer T is formed by a material that transmits a large amount of light beams without absorbing color components of the light beams. The transparent layer T is made of a transparent material such as water or transparent plastic. The transparent layer T may be formed of air. In other words, the first layer L1 and the second layer L2 may be arranged in parallel at a predetermined distance apart from each other. The reflective substrate B is formed of a mirror, white paper, or the like, and is formed of a member capable of easily visually recognizing colors given to the first layer L1 and the second layer L2.

As illustrated in FIG. 1 and FIG. 2, the first layer L1 and the second layer L2 are virtually divided into a plurality of cells C. The position of each cell C does not have to be visually recognizable, as long as a printing machine or the like which gives a color to a color region of the cell C can specify the position of each cell C based on its defined cell position. For example, cells C adjacent to each other do not have to be physically parted, and do not have to have therebetween a clear partition such as a line, divider, recess, or the like. Further, two cells C adjacent to each other may be visually unrecognizable, by giving an identical color to the edges of the two cells at the boundary, or making the edges uniformly colorless.

In the embodiment of the present disclosure, each cell C of the first layer L1 and each cell C of the second layer L2 are formed by similarly dividing the layers. The cells C of the first layer L1 are formed at positions shifted in the Z-axis direction from the cells C of the second layer L2. More specifically, as shown in FIG. 2, a first cell C1 of the first layer L1 is formed at a position shifted in the Z-axis direction from a second cell C2 of the second layer L2, in the embodiment of the present disclosure. The same goes for the other cells. In the embodiment of the present disclosure, the relationship between cells formed at positions shifted in the Z-axis direction, such as the one between the first cell C1 and the second cell C2, is referred to as "correspond(ing)".

The embodiment of the present disclosure deals with a case where a pair of corresponding cells C are shifted away from each other in the Z-axis direction. However, the present disclosure is not limited thereto. In an example shown in FIGS. 3A and 3B, a cell C11 of the first layer L1 corresponds to a cell C21 of the second layer L2, a cell C12 of the first layer L1 corresponds to a cell C22 of the second layer L2, and a cell C13 of the first layer L1 corresponds to a cell C23 of the second layer L2.

Figure 3A:
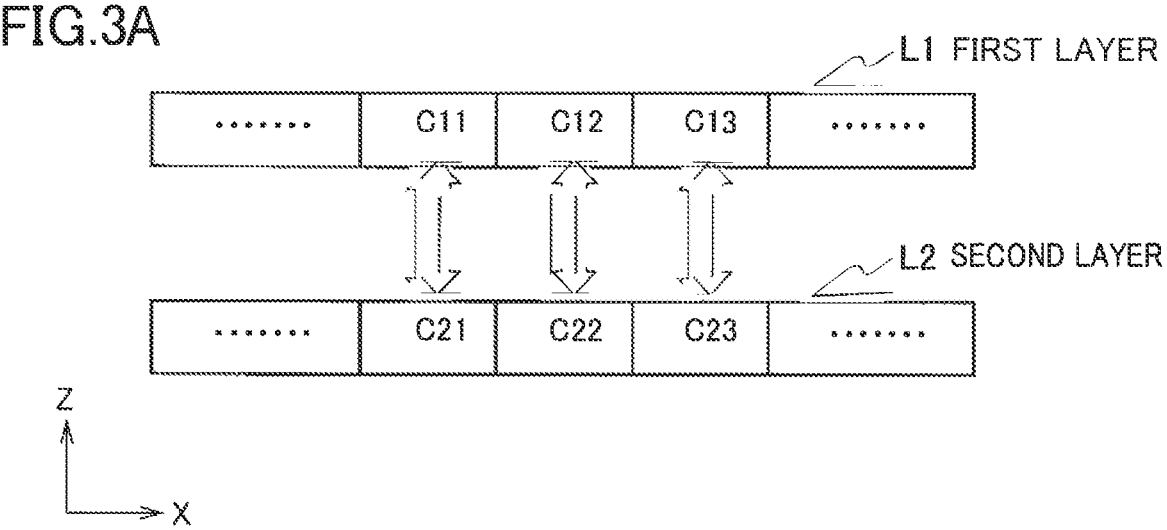
FIGS. 3A and 3B are diagrams for explaining a positional relationship of corresponding cells in the display medium according to the embodiment of the present disclosure.

The corresponding cells in the example of FIG. 1 and the like are shifted from each other only in the Z-axis direction, as shown in FIG. 3A. The corresponding cells may be shifted from each other in the Z-axis direction and in an X-axis direction, as shown in FIG. 3A. Further, although illustration is omitted, the corresponding cells may be shifted in the Z-axis direction and a Y-axis direction, or shifted in all 3 directions: i.e., in the Z-axis direction, X-axis direction, and the Y-axis direction.

Figure 4A:
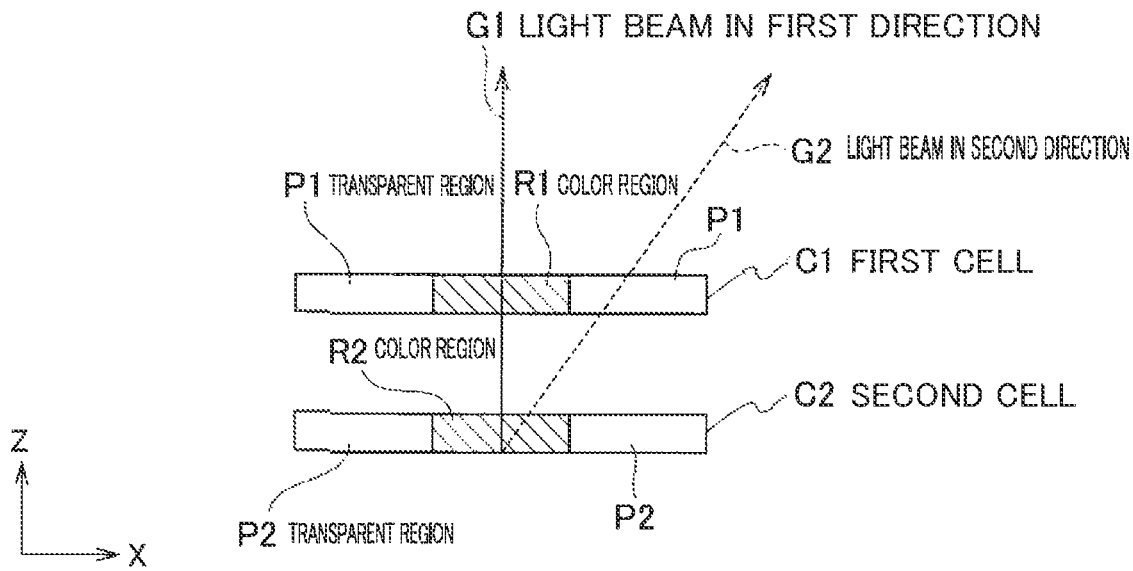
FIG. 4A and FIG. 4B are a side view and a perspective view, respectively, for explaining cells in a display medium according to the embodiment of the present disclosure.
Figure 4B:
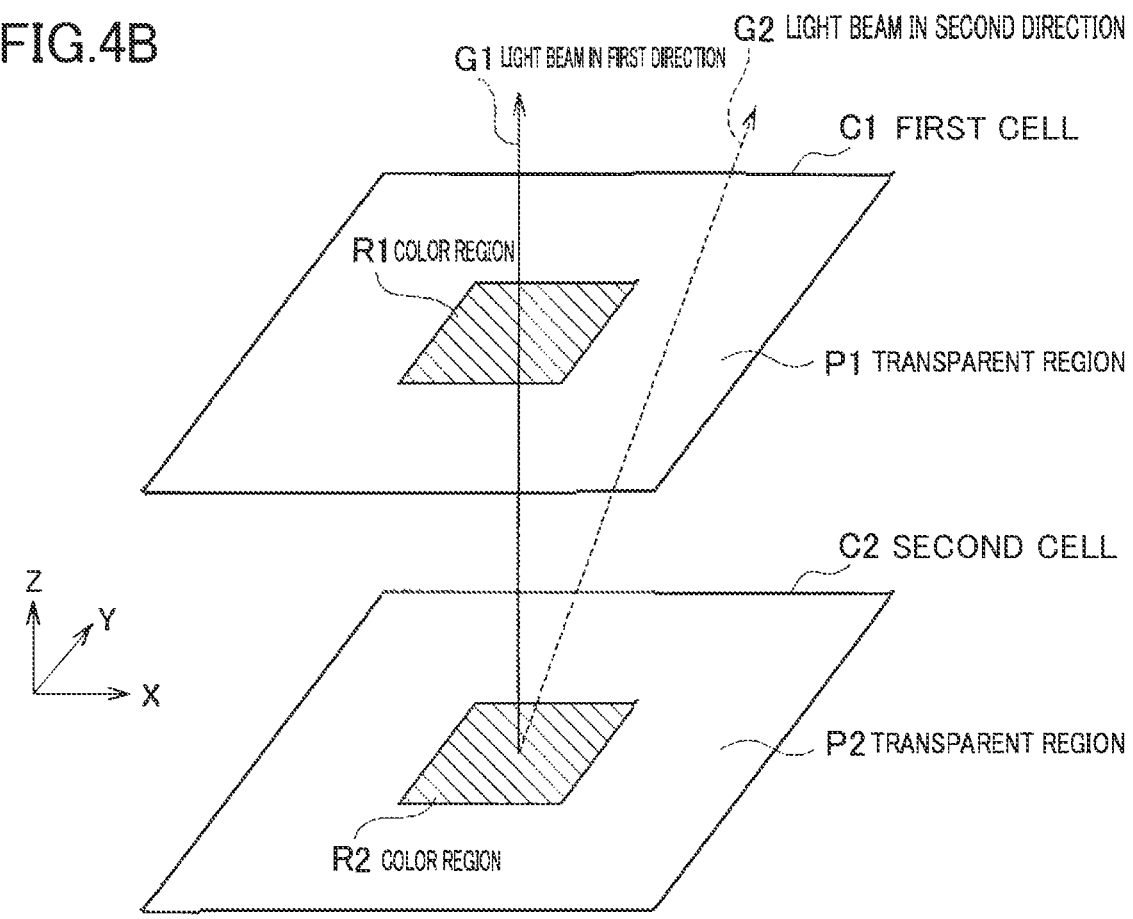

Referring to FIGS. 4A and 4B, the following describes the corresponding cells C. The first layer L1 and the second layer L2 having the cells C include color regions R1 and R2 to which colors are given, respectively. The display medium 1 displays first contents on the basis of parts of the first layer L1 and the second layer L2 through which a light beam G1 in the first direction passes. Similarly, the display medium 1 displays second contents on the basis of parts of the first layer L1 and the second layer L2 through which a light beam G2 in the second direction passes.

Note that, in the embodiment of the present disclosure, the light beam G1 in the first direction and the light beam G2 in the second direction are different from each other in their direction. Further, a single color is given to the color regions R1 and R2. Note that a single color means a color that can be perceived as a single color by a human eye, and also encompasses a case where a printing machine mixes specific colors such as cyan, magenta, yellow, and black for printing so that the mix of the colors appear to be a single color.

In the embodiment of the present disclosure, the first contents is displayed with the light beam G1 in the first direction, and the second contents is displayed with the light beam G2 in the second direction. Accordingly, each pair of corresponding cells C forms a part of the first contents with the light beam G1 in the first direction and forms a part of the second contents with the light beam G2 in the second direction.

Here, the light beam G1 in the first direction and the light beam G2 in the second direction are different in at least one of their elevation angles or azimuth angles. FIGS. 4A and 4B show an example where the elevation angle is different between the light beam G1 in the first direction and the light beam G2 in the second direction. The light beam G1 in the first direction is perpendicular to the XY plane, that is, has an elevation angle of 90 degrees with respect to the XY plane. The light beam G2 in the second direction is oblique to the XY plane, that is, has an elevation angle of less than 90 degrees with respect to the XY plane.

As illustrated in FIGS. 4A and 4B, the first layer L1 and the second layer L2 on which the cells C are formed are each formed of a transparent member. The first layer L1 and the second layer L2 each has a color region to which a color is given and a colorless transparent region.

For example, when the light beam G1 in the first direction passes a pair of cells C in the first layer L1 and the second layer L2, the display medium 1 can display a part of the first contents corresponding to the pair of cells C, with a combination of colors of the pair of cells C. Similarly, when the light beam G2 in the second direction passes the pair of cells C in the first layer L1 and the second layer L2, the display medium 1 can display a part of the second contents corresponding to the pair of cells C, with a combination of colors of the pair of cells C. Since each pair of cells C in the first layer L1 and the second layer L2 operates in the same manner, the display medium 1 can display different set of contents in two directions.

Here, the pair of cells C through which the light beam G1 in the first direction or the light beam G2 in the second direction passes do not have to be given a color, and the light beam G1 in the first direction or the light beam G2 in the second direction may pass through a transparent region.

In the embodiment of the present disclosure, the light beam G1 in the first direction and the light beam G2 in the second direction pass through at least one color region of the first layer L1 or the second layer L2. In other words, since both the light beam G1 in the first direction and the light beam in G2 of the second direction pass through at least one color region, a color is observable with the light beam G1 in the first direction and the light beam G2 in the second direction. Further, at least one of the light beam G1 in the first direction or the light beam G2 in the second direction passes through both the color region of the first layer L1 and the color region of the second layer L2. In other words, since at least one of the light beam G1 in the first direction or the light beam G2 in the second direction passes through color regions of the two layers, a mix of colors of the color regions is observed.

By observing the light beam in two directions as described above, the light beams in the two directions have colors, and a color which is a mix of colors of the color regions of the two layers is observed with the light beam in at least one of the directions. Thus, the display medium 1 can display different set of contents with light beams in two directions.

In the example of FIGS. 4A and 4B, the first cell C1 provided in the first layer L1 has a color region R1 to which a color is given and a colorless transparent region P1. Similarly, the second cell C2 provided in the second layer L2 has a color region R2 to which a color is given and a colorless transparent region P2. The color region R1 of the first cell C1 is provided at a position shifted in the Z-axis direction from the color region R2 of the second cell C2. The pair of corresponding cells C displays a part of a plurality of sets of contents displayed by the display medium 1, which part in the position of that pair.

Here, the light beam G1 in the first direction passes through the color region R1 of the first cell C1 in the first layer L1 and the color region R2 of the second cell C2 in the second layer L2. Therefore, a color which is a mix of the colors of the color region R1 and the color region R2 is observed with the light beam G1 in the first direction. The color obtained by mixing the colors of the color region R1 and the color region R2 forms a part of the first contents. On the other hand, the light beam G2 in the second direction passes through the transparent region P1 of the first cell C1 in the first layer L1 and the color region R2 of the second cell C2 in the second layer L2. Therefore, a color of the color region R2 is observed with the light beam G2 in the second direction. The color of the color region R2 forms a part of the second contents. As described, in the example of FIGS. 4A and 4B, different colors are observed from different directions, respectively. Therefore, the display medium 1 is capable of displaying different sets of contents in different directions.

The example shown in FIGS. 4A and 4B deals with a case where the light beam G1 in the first direction passes through both the color region R1 and the color region R2, and the light beam G2 in the second direction passes through the transparent region P1 and the color region R2; however, the present disclosure is not limited to this. For example, the light beam G1 in the first direction may pass through both the color region R1 and the color region R2, and the light beam G2 in the second direction may pass through the color region R1 of the first cell C1 and the transparent region P2 of the second cell.

Figure 5:
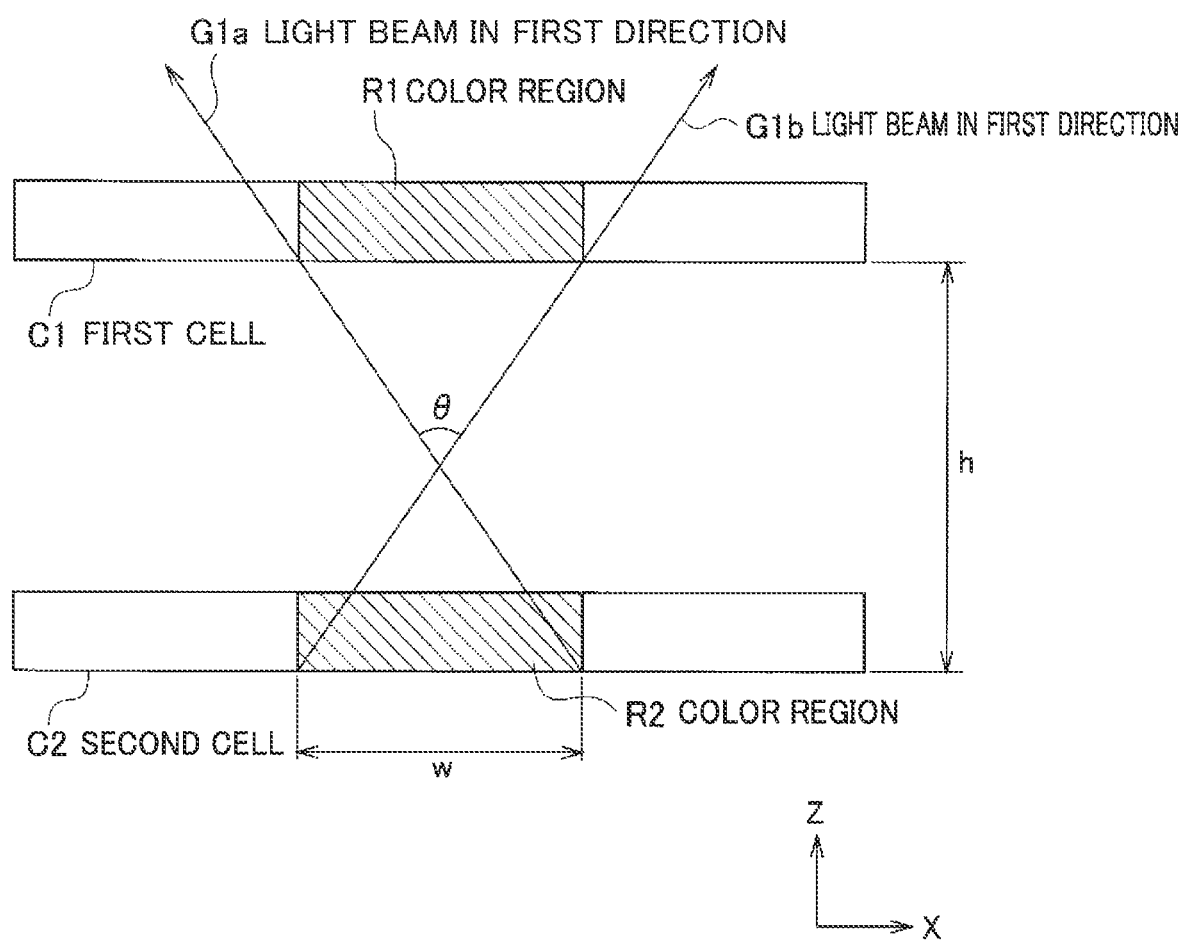
FIG. 5 is a view for explaining a range, within which contents are visually recognizable, of the display medium according to an embodiment of the present disclosure.

With reference to FIG. 5, the following describes a range, within which contents are visually recognizable, of the display medium 1 with light beams in two directions, according to the embodiment of the present disclosure. The range within which contents are visually recognizable is constrained by the width of the color region in the X-axis direction.

A range of a view point that can visually recognize the light beam G1 in the first direction passing through the color region R1 of the first cell C1 and the color region R2 of the second cell C2 is above the first cell C1, and within a range of internal angles of light beams G1a and G1b of the first direction shown in FIG. 5. The range of internal angles of the light beams G1a and G1b of the first direction is a range passing through a lower end of the color region R2 of the second cell C2 in the X-axis direction and the lower end of the color region R1 of the first cell C1 in the X-axis direction.

Where a Z-axis directional length from the bottom surface of the first cell C1 to the bottom surface of the second cell C2 is h, an intersecting point of the light beams G1a and G1b of the first direction is at h/2 from the bottom surface of the first cell C1 or the bottom surface of the second cell C2. Further, where an X-axis directional width of the color region is x, the internal angle θ of the light beams G1a and G1b of the first direction is expressed as equation (1).

[Mathematical 1]

$$\theta = 2 * \tan^{-1} 2w/h \qquad \text{equation (1)}$$

The internal angle θ of the light beams G1a and G1b of the first direction calculated by the above equation (1) is a resolution (accuracy) of the light beam G1 in the first direction. The light beam G1 in the first direction may be within a range of this θ in the embodiment of the present disclosure. The range of the light beam G2 in the second direction is also calculated in the same manner.

Note that, regarding the display medium 1 in which a transparent region is arranged on both sides of the color regions R1 and R2 as shown in FIG. 5, the range of the light beam G1 in the first direction indicated by equation (1) is appropriately calculated by an arrangement of the color regions in the display medium 1. Since both of the color regions R1 and R2 cannot be visually recognizable outside the range of the light beam G1 in the first direction indicated by equation (1), contents that can be displayed by mixing colors of the color regions R1 and R2 is not visually recognizable.

Thus, according to the embodiment of the present disclosure, at least one of the light beam G1 in the first direction or the light beam G2 in the second direction passes through both of the color regions R1 and R2 in the corresponding cells C1 and C2 of the first layer L1 and the second layer L2. The light beam in the other direction passes through only one of the color regions R1 and R2. This allows different colors to be observed in different directions in the embodiment of the present disclosure.

(Variation)

The example of FIGS. 4A and 4B deals with a case where one color region is provided in each of the first cell C1 of the first layer L1 and the second cell C2 of the second layer L2. A variation described below deals with a case where a plurality of color regions are provided in each of the first layer L1 and the second layer L2.

In the variation shown in FIG. 6, the corresponding first cell C1 and the second cell C2 each has three color regions. The first cell C1 has color regions R11, R12, and R13 and has transparent regions P11 and P12 on both sides of the color regions R11, R12, and R13, respectively. The second cell C2 has color regions R21, R22, and R23 and has transparent regions P21 and P22 on both sides of the color regions R21, R22, and R23, respectively. As shown in FIG. 4B, the transparent regions P11 and P12 may be continuous with any of the first cells C1 on the XY plane. The same goes for the transparent regions P21 and P22.

In the example shown in FIG. 6, the light beam G1 in the first direction and the light beam G2 in the second direction are different in their azimuth angles at the time of projecting the light beams on the XY plane. Further, for the sake of convenience, the light beam G1 in the first direction is referred to as light beams G11, G12, G13, and G14 of the first direction, depending on a combination of the color regions or a combination of the color region and the transparent region through which the light beam G1 passes through. Similarly, light beam G2 in the second direction is also referred to as light beams G21, G22, G23, and G24 of the second direction.

The light beam G11 in the first direction passes through the transparent region P11 of the first cell C1 and the color region R21 of the second cell C2. A color of the color region R21 is observed with the light beam G11 in the first direction. The light beam G12 in the first direction passes through the color region R11 of the first cell C1 and the color region R22 of the second cell C2. A mixed color of the color region R11 and the color region R22 is observed with the light beam G12 in the first direction. The light beam G13 in the first direction passes through the color region R12 of the first cell C1 and the color region R23 of the second cell C2. A mixed color of the color region R12 and the color region R23 is observed with the light beam G13 in the first direction. The light beam G14 in the first direction passes through the color region R13 of the first cell C1 and the transparent region P22 of the second cell C2. A color of the color region R13 is observed with the light beam G14 in the first direction.

Thus, with the light beam G1 in the first direction, the color of the color region R21, the mixed color of the color region R11 and the color region R22, the mixed color of the color region R12 and the color region R23, and the color of the color region R13 are observable. These colors form a part of the first contents.

The light beam G21 in the second direction passes through the color region R11 of the first cell C1 and the transparent region P21 of the second cell C2. A color of the color region R11 is observed with the light beam G21 in the second direction. The light beam G22 in the second direction passes through the color region R12 of the first cell C1 and the color region R21 of the second cell C2. A mixed color of the color region R12 and the color region R21 is observed with the light beam G22 in the second direction. The light beam G23 in the second direction passes through the color region R13 of the first cell C1 and the color region R22 of the second cell C2. A mixed color of the color region R13 and the color region R22 is observed with the light beam G23 in the second direction. The light beam G24 in the second direction passes through the transparent region P12 of the first cell C1 and the color region R23 of the second cell C2. A color of the color region R23 is observed with the light beam G24 in the second direction.

Thus, with the light beam G2 in the second direction, the color of the color region R11, the mixed color of the color region R12 and the color region R21, the mixed color of the color region R13 and the color region R22, and the color of the color region R23 are observable. These colors form a part of the second contents.

In this variation, the first contents is displayed with the light beam G1 in the first direction, and the second contents is displayed with the light beam G2 in the second direction, as in the case of the above embodiment of the present disclosure. Accordingly, each pair of corresponding cells C forms a part of the first contents with the light beam G1 in the first direction and forms a part of the second contents with the light beam G2 in the second direction.

As described, in the above variation, the light beam G1 in the first direction and the light beam G2 in the second direction both pass through the color region of at least one of the first layer L1 or the second layer L2, and the light beam G1 in the first direction and the light beam G2 in the second direction partially pass through the color region of the first layer L1 and the color region of the second layer L2. Further, in the above variation, the light beam G1 in the first direction and the light beam G2 in the second direction are different from each other in a combination of colors to be mixed. As a result, different color combinations can be observed with the light beam G1 in the first direction and with the light beam G2 in the second direction. Even when each pair of corresponding cells C has a plurality of color regions, the display medium 1 can display a plurality of sets of contents as in the above embodiment of the present disclosure.

The example of FIG. 6 deals with a case where two sets of contents are displayed by the light beam G1 in the first direction and the light beam G2 in the second direction. However, the display medium 1 may be designed to display three sets of contents by a light beam in another direction. For example, the other set of contents may be displayed by a light beam whose elevation angle with respect to the XY plane is lower than the elevation angle of the light beam G1 in the first direction, and passes through the transparent region P11 and the color region R22, the color region R12 and the color region R23, and the color region R13. Similarly, the other set of contents may be displayed with light whose elevation angle with respect to the XY plane is lower than the elevation angle of the light beam G2 in the second direction. Alternatively, the other set of contents may be displayed with a light beam whose elevation angle is 90 degrees and perpendicular to the XY plane. As described, the display medium 1 is capable of displaying any number of sets of contents with light beams in any number of directions.

Note that the above embodiment of the present disclosure and the variation deal with a case where the first layer L1 and the second layer L2 are divided into cells C, and each cell C is divided into a color region and a transparent region. However, the present disclosure is not limited to this. The first layer L1 and the second layer L2 may not be divided into the cells C, a transparent region does not have to be provided, and the display medium 1 may display a plurality of sets of contents by a combination of a color region and another color region.

Implementation Example

With reference to FIG. 7, the following describes an exemplary implementation of the first layer L1, the second layer L2, and the transparent layer T. For example, as illustrated in FIG. 7, there is a method of implementing the display medium 1 by printing on a transparent member H with a printing machine. The transparent member H is for example a transparent film or an ultraviolet curable resin.

In a case of printing the color regions of the first layer L1 and the second layer L2 with the printing machine, the size of each color region is an integer times the minimum dot width printable by the printing machine.

Figure 7A:
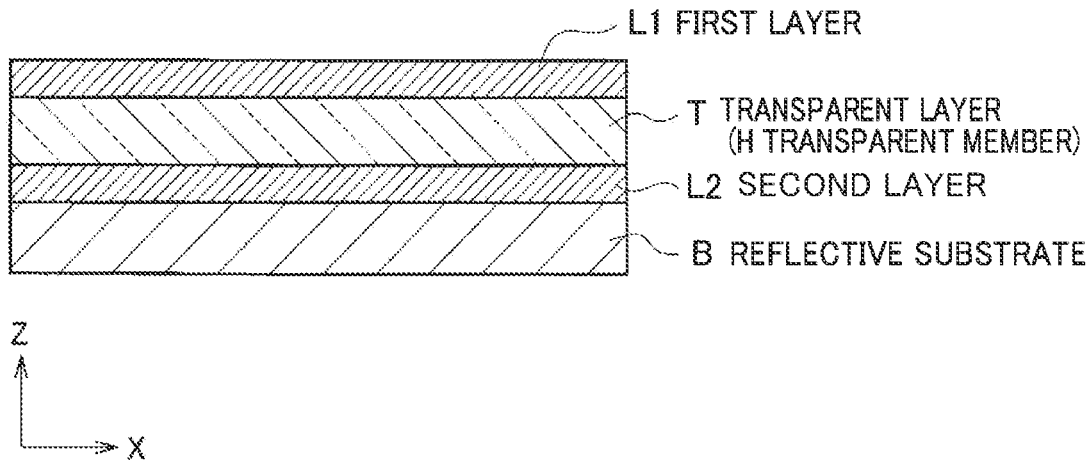
FIGS. 7A-7C are exemplary implementations of display media.

In the example of FIG. 7(a), the first layer L1 and the second layer L2, as well as their color regions, are printed on the front surface and the back surface of the transparent member H. On the side where the second layer L2 is printed, the reflective substrate B is provided. The transparent member H serves as the transparent layer T, and plays a role of securing the distance between the first layer L1 and the second layer L2. The example of FIG. 7(a) is suitable for a case of using a printing machine capable of accurately performing double-sided printing, such as simultaneously printing on both sides of the transparent member H. Printing as in the example of FIG. 7(a) reduces misalignment of the cells C, and forms a display medium 1 capable of accurate displaying.

Figure 7B:
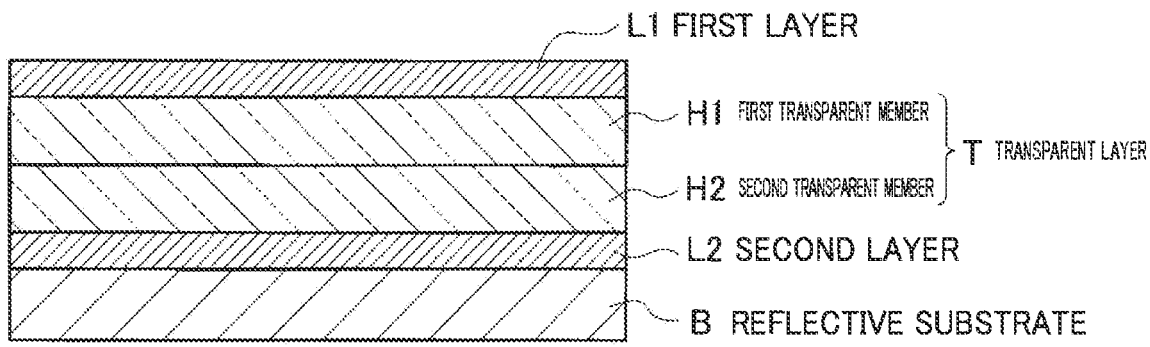

In an example of FIG. 7(b), a color region of the first layer L1 is printed on a first transparent member H1, and a color region of the second layer L2 is printed on a second transparent member H2. The surfaces of the first transparent member H1 and the second transparent member H2 having no color regions printed are combined together to form a transparent layer T with the first transparent member H1 and the second transparent member H2. On the surface of the second transparent member H2 where the second layer L2 is printed, the reflective substrate B is provided. Even if a printing machine capable of performing accurate double-sided printing is not available, a suitable display medium 1 can be formed by performing printing on each of the first transparent member H1 and the second transparent member H2, as in the example of FIG. 7(b), and positioning the first transparent member H1 and the second transparent member H2 with each other.

Figure 7C:
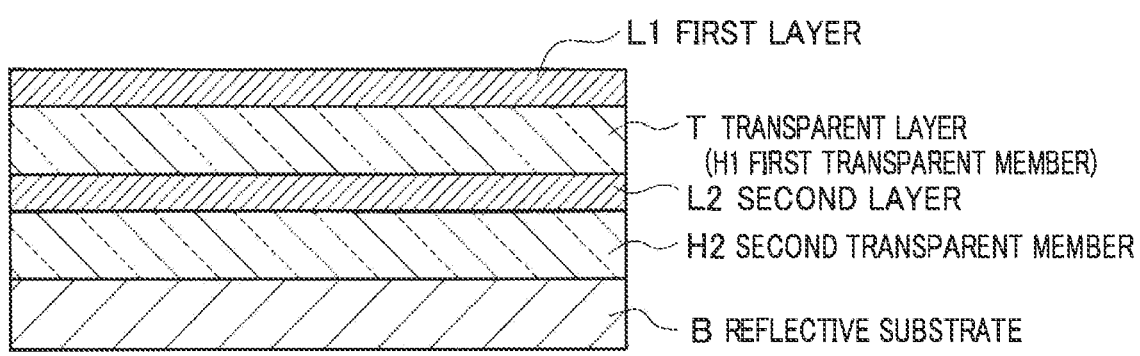

An example of FIG. 7C prints the color region of the first layer L1 on the first transparent member H1 and prints a color region on the second layer L2 of the second transparent member H2, as in the example of FIG. 7B; however, the way of combining the first transparent member H1 and the second transparent member H2 is different. In FIG. 7C, the printed surface of the second transparent member H2 is stacked on the non-printed surface of the first transparent member H1. A reflective substrate B is overlaid on the non-printed surface of the second transparent member H2. The first transparent member H1 serves as a transparent layer T. Although the example of FIG. 7C deals with a case where a transparent layer is formed between the second layer L2 and the reflective substrate B, light beam reflected on the reflective substrate B is hardly affected and the visibility is hardly affected.

The examples of FIG. 7 deals with a case where the display medium 1 has a size that can be printed by a printing machine. However, even in a case where the display medium 1 is too small or too large to print with the printing machine, each member is suitably selected.

(Processing Device)

Figure 8:
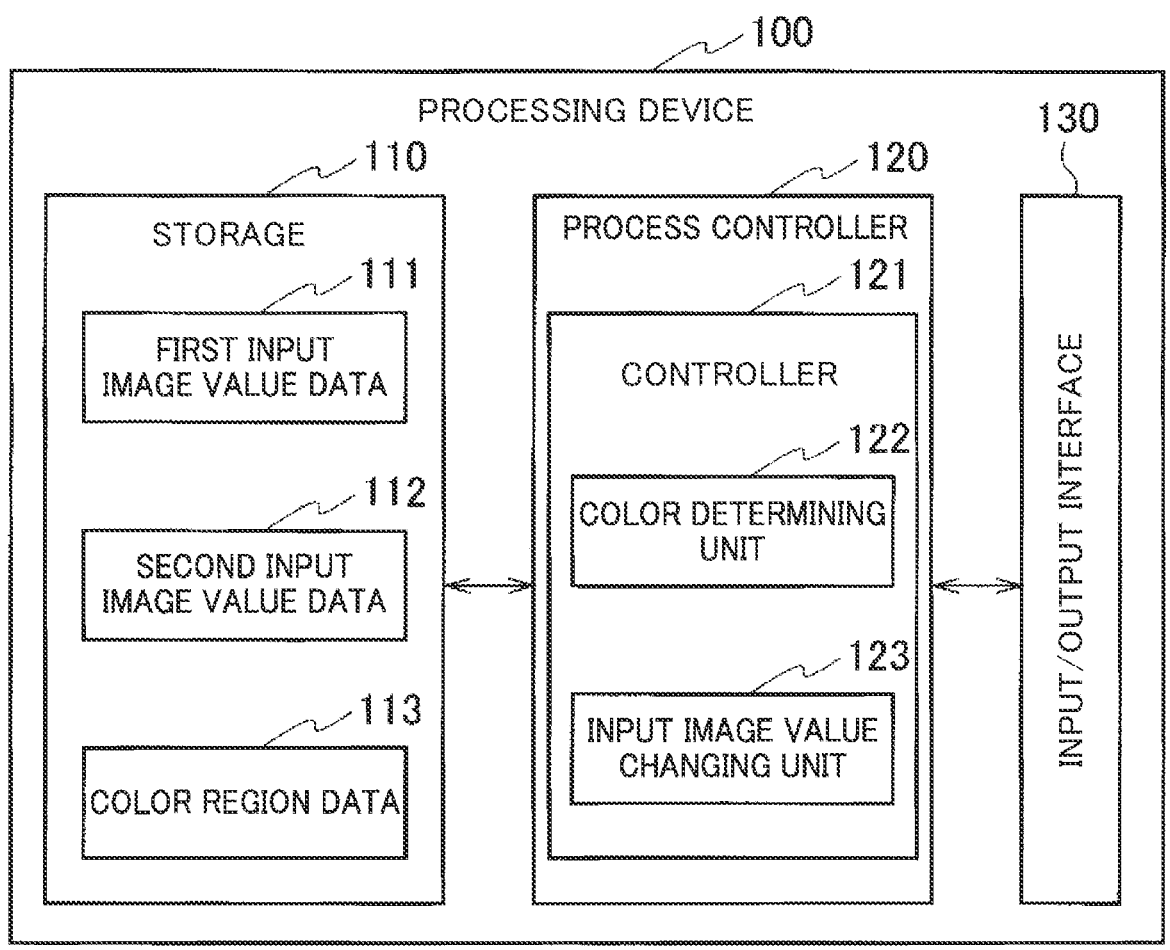
FIG. 8 is a diagram for explaining a hardware configuration and functional blocks of a processing device for determining colors of color regions of the display medium according to the embodiment of the present disclosure.

With reference to FIG. 8, the following describes a processing device 100 configured to calculate colors to be given to the color regions of the display medium 1 related to the embodiment of the present disclosure. To the processing device 100, a direction, a set of contents corresponding to the direction, a position of the cell C, a position of the color region in the cell C, and the like are input. The processing device 100 calculates the color to be given to the color region of each cell C so that the display medium 1 can display the input content in the input direction.

Figure 3B:
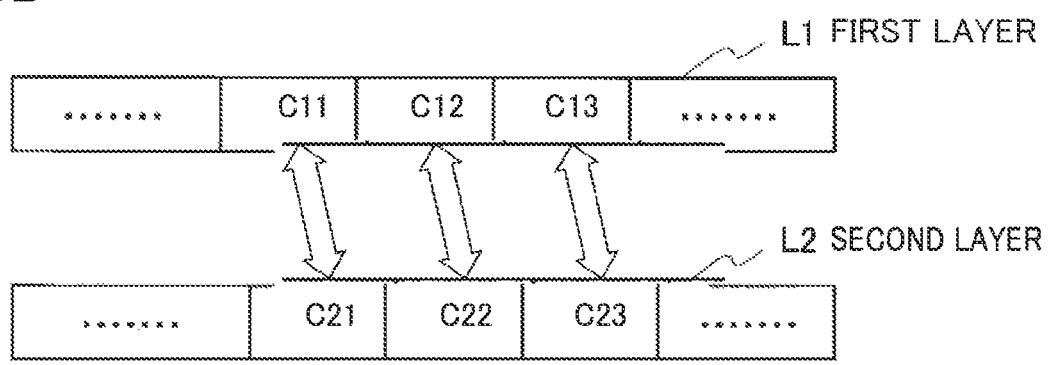

The processing device 100 calculates, for each pair of corresponding cells C, the color to be given to the pair of cells C. The corresponding pair of cells C is, for example, a pair of cell C11 and cell C21, a pair of cell C12 and cell C22, and a pair of cells C13 and cell C23, as shown in FIGS. 3A and 3B. The pair of cells C for which the processing device 100 calculates the color is the first cell C1 and the second cell C2 shown in FIG. 6. The first cell C1 and the second cell C2 each has three color region and display a part of two sets of contents by light beams in two directions.

Further, to simplify the processing, the color regions of the first cell C1 and the second cell C2 are arranged at positions apart from the respective ends of the first cell C1 and the second cell C2. In the example of FIG. 6, the color regions R11, R12, and R13 of the first cell C1 reaches the ends of the first cell C1 through the transparent regions P11 and P12. Similarly, the color regions R21, R22, and R23 of the second cell C2 reach the ends of the second cell C2 through the transparent regions P21 and P22.

The transparent region is formed so that a light beam in a predetermined direction passing through at least one of the six color regions of the first cell C1 or the second cell C2 passes through the first cell C1 and the second cell C2, and does not pass through the color region of cells other than the first cell C1 and the second cell C2. Thus, since the light beam in the predetermined direction passing through at least one of the six color regions of the first cell C1 or the second cell C2 does not pass through the color region of the cell C other than the pair of the first cell C1 and the second cell C2 corresponding to each other, the color to be given to the color regions of the corresponding pair of first cell C1 and the second cell C2 may be determined based on a mixed color of the color regions of the corresponding pair of the first cell C1 and the second cell C2. This suppresses the amount of calculation by the processing device 100.

As shown in FIG. 8, the processing device 100 is a general computer including a storage 110, a process controller 120, and an input/output interface 130. By having this general computer execute a processing program, functions shown in FIG. 8 are achieved.

The storage 110 is a read-only memory (ROM), a random-access memory (RAM), or a hard disk, for example, that stores various types of data such as input data, output data, and intermediate data to allow the process controller 120 to execute the process. The process controller 120 is a central processing unit (CPU) that reads and writes the data stored in the storage 110 and inputs and outputs data to and from the input/output interface 130 to execute process in the processing device 100. The input/output interface 130 is an interface connecting the process controller 120 and an external device (not shown) such as a printer. In the embodiment of the present disclosure, the input/output interface 130 is a device for manufacturing the display medium 1, or a memory read by a device for manufacturing the display medium 1.

The storage 110 stores a processing program, first input image value data 111, second input image value data 112, and color region data 113.

The first input image value data 111 specifies a color of a position for each cell of the first contents. The first input image value data 111 includes a value for specifying the color of the first contents at a position corresponding to a process-targeted pair of cells to be processed by a color determining unit 122 described later. In the embodiment of the present disclosure, the first input image value data 111 expresses each color component of RGB in a range of [0, 1]. The value "1" means to completely pass light of that color component, and "0" means to completely block light of that color component.

The second input image value data 112 specifies a color of a position for each cell of the second contents. The second input image value data 112 includes a value for specifying the color of the second contents at a position corresponding to a process-targeted pair of cells to be processed by a color determining unit 122 described later. The method for specifying the color with the second input image value data 112 is the same as that of the first input image value data 111.

The color region data 113 specifies the color of each color region calculated by the process controller 120. The color region data 113 correlates an identifier of a cell, an identifier of a color region in the cell, and a value specifying a color. The value specifying the color expresses each color component of RGB in a range of [0, 1], as in the case of the first input image value data 111.

The process controller 120 includes a controller 121. The controller 121 includes the color determining unit 122 and an input image value changing unit 123.

The controller 121 instructs the color determining unit 122 and an input image value changing unit 123 execution of process. The controller 121 inputs the first input image value data 111 and the second input image value data 112 to the color determining unit 122 and optimizes the colors of the color regions of the first cell C1 and the second cell C2, and then causes the input image value changing unit 123 to update the input image values, with the optimized colors of the color regions as input.

Further, the controller 121 causes the color determining unit 122 to optimize the colors of the color regions of the first cell C1 and the second cell C2 using the input image values updated by the input image value changing unit 123 as the input, and then causes the input image value changing unit 123 to update the input image values by using the optimized colors of the color regions as input. The controller 121 repeats the process of the color determining unit 122 and the input image value changing unit 123 until a predetermined terminating condition is satisfied. The terminating condition is specified by, for example, the number of times the process is performed, time taken for the process, and the like. The terminating condition may be a variable for optimization being converged.

Figure 9:
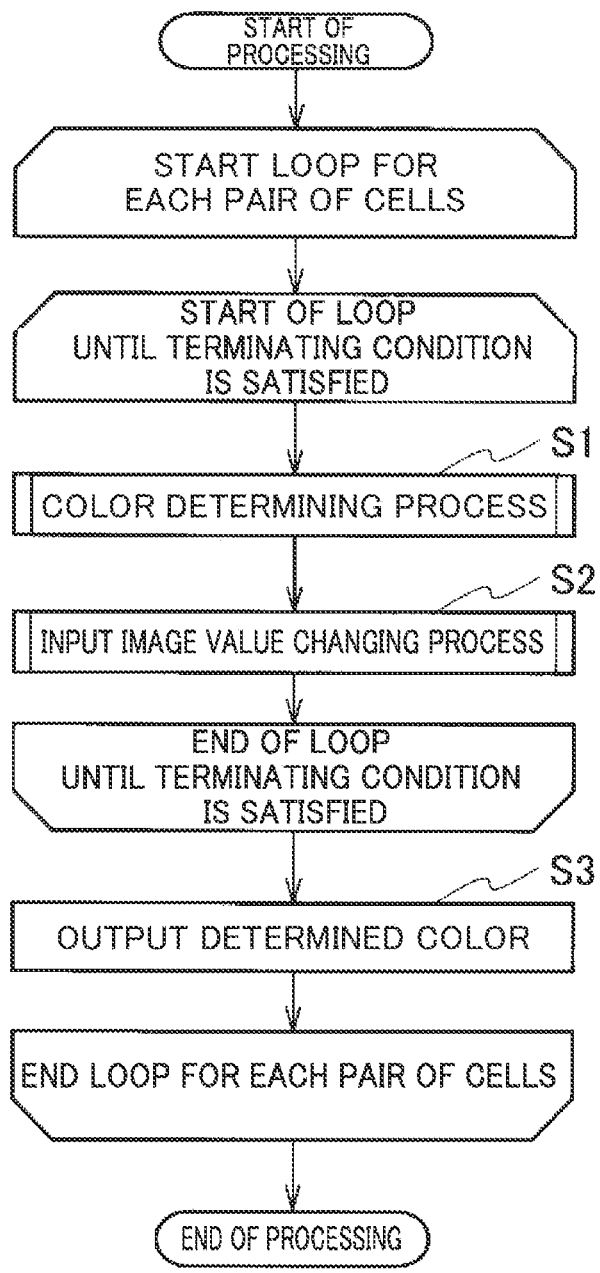
FIG. 9 is a flowchart for explaining processing of a controller in the processing device according to the embodiment of the present disclosure.

With reference to FIG. 9, the following describes control processing by the controller 121. First, the controller 121 repeats steps S1 to S3 for each pair of cells. The pair of cells is a combination of a cell of the first layer L1 and a cell of the second layer L2 corresponding to the cell of the first layer L1. Here, it is assumed that the first cell C1 and the second cell C2 correspond to each other and forms a pair of cells.

The controller 121 executes, for each process-targeted pair of cells, a color determining process by the color determining unit 122 in step S1, until the terminating condition is satisfied, and then executes an input image value changing process by the input image value changing unit 123 in step S2. When the terminating condition is satisfied for the process-targeted cells, the color region data 113 including the color of each color region of the process-targeted cells is output in step S3.

Here, when step S1 is executed for the first time, the color determining unit 122 refers to the first input image value data 111 and the second input image value data 112 of the first contents and the second contents. When step S1 is executed for the second time or thereafter, the color determining unit 122 refers to the input image value obtained as a result of processing by the input image value changing unit 123 in step S2 which is the immediately preceding step.

When the process is terminated upon satisfying the terminating condition of step S1 to step S3 for the process-targeted pair of cells, the controller 121 executes step S1 to step S3 for the next pair of cells to be processed. When steps S1 to S3 is completed for each pair of cells, the controller 121 terminates the processing.

(Color Determining Unit)

In response to an instruction from the controller 121, the color determining unit 122 determines the color of a process-targeted pair of corresponding cells (first cell C1 and second cell C2) of the first layer L1 and the second layer L2 according to a multiplicative update rule. The color determining unit 122 repeats a first process for optimizing the color of the first cell C1 of the first layer L1, and a second process for optimizing the color of the second cell C2 of the second layer L2 to optimize colors to be given for the color regions of the first cell C1 and the second cell C2.

Figure 10:
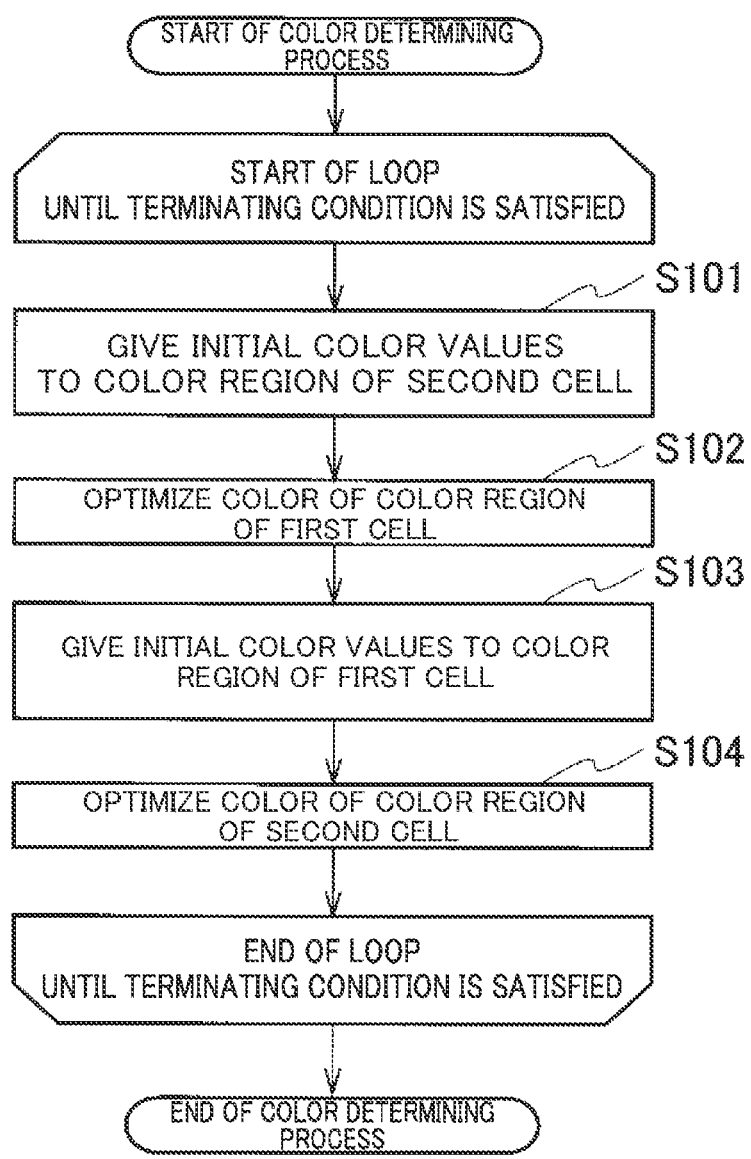
FIG. 10 is a flowchart for explaining processing of a color determining unit in the processing device according to the embodiment of the present disclosure.

With reference to FIG. 10, the following describes the color determining process by the color determining unit 122. The processing shown in FIG. 10 corresponds to step S1 of FIG. 9. The color determining unit 122 repeats step S101 to step S104 until a predetermined terminating condition is satisfied.

First, in step S101 and step S102, the color determining unit 122 performs the first process. In step S101, the color determining unit 122 gives initial color values to each color region of the second cell C2. In step S102, the color determining unit 122 optimizes the color of each color region of the first cell C1 based on the initial values of the second cell C2 given in step 101.

Next, in step S103 and step S104, the color determining unit 122 performs the second process. In step S103, the color determining unit 122 gives initial color values to each color region of the first cell C1. In step S104, the color determining unit 122 optimizes the color of each color region of the second cell C2 based on the initial values of the first cell C1 given in step 103.

The color determining unit 122 terminates the process when the terminating condition is satisfied.

When each color region of the process-targeted first cell C1 is optimized for the first time, the color determining unit 122 sets 1 for the values of RGB as initial values of each color region of the second cell C2 in step S101. When each color region of the process-targeted first cell C1 is optimized for the second time or thereafter, the color determining unit 122 gives a color optimized in the immediately preceding second process to each color region of the second cell C2 and execute once again the first process. The color determining unit 122 sets, as the initial values of each color region of the second cell C2, the RGB values of the color region of the second cell C2 having been optimized in the immediately preceding second process.

When each color region of the process-targeted second cell C2 is optimized for the first time, the color determining unit 122 sets, as initial values of each color region of the first cell C1, RGB values of each color region of the first cell C1 obtained in the immediately preceding first process in step S103. When the process-targeted second cell C2 is optimized for the second time or thereafter, the color determining unit 122 gives a color optimized in the immediately preceding first process to each color region of the first cell C1 and execute once again the second process.

The example of FIG. 10 deals with a case the color of the color region in the second cell C2 is optimized after the color of the color region of the first cell C1 is optimized. However, the color of the color region of the first cell C1 may be optimized after the color of the color region of the second cell C2 is optimized. In such a case, when the process-targeted second cell C2 is optimized for the first time, the color determining unit 122 sets 1 for the values of RGB as initial values of each color region of the first cell C1. When the process-targeted second cell C2 is optimized for the second time or thereafter, the color determining unit 122 sets, as initial values of each color region of the first cell C1, RGB values of each color region of the first cell C1 obtained in the immediately preceding process.

In the first process, the color determining unit 122 gives initial color values to the second cell C2, and optimizes the color of each color region of the first cell C1 so that the difference between the color of the process-targeted pair of cells observed with the light beam G1 in the first direction and the color of the first contents is small, and that the difference between the color of the process-targeted pair of cells observed with the light beam G2 in the second direction and the color of the second contents is small.

If the second process is not executed, a predetermined value is set as the initial color values given to the second cell C2. For example, a value of "1" is set for each value of the RGB. When the second process is executed, the values of RGB having been optimized in the immediately preceding second process are set as the initial color values given to the second cell C2.

Figure 11:
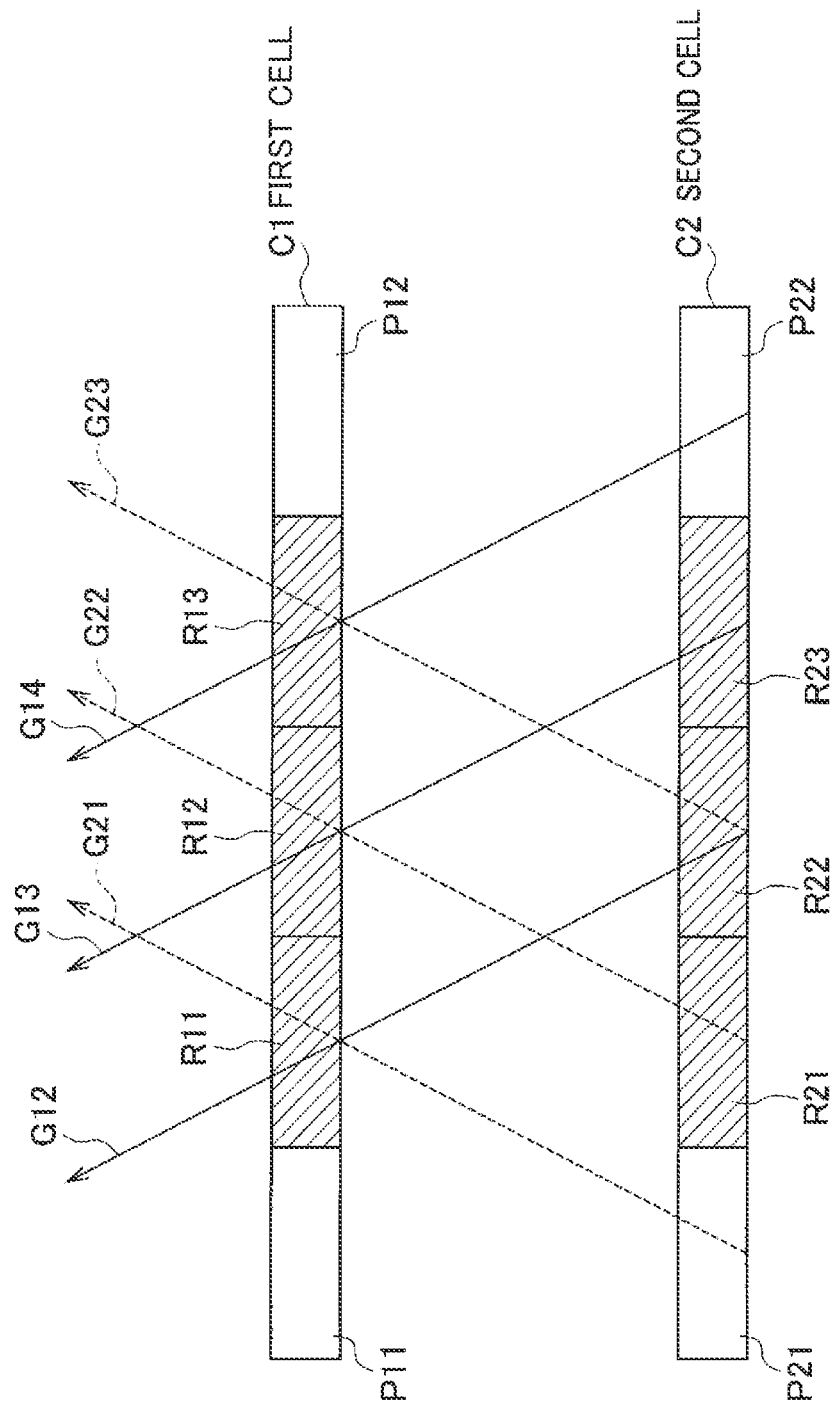
FIG. 11 is a diagram for explaining light to be considered in a first processing of the color determining unit.

In the first process, as shown in FIG. 11, the colors of the color regions of the first cell C1 are optimized from the colors of the light beams in predetermined directions passing through the color region R21, R22, R23 and the transparent regions P21 and P22, respectively, with the second cell C2 as a reference. In the first process, the color determining unit 122 considers the light beams G12, G13, and G14 of the first direction and the light beams G21, G22, and G23 of the second direction.

The color determining unit 122 optimizes the values of RGB color components of each color region of the first cell C1 by equation (2). For example, after optimizing the value of the R component of each color region of the first cell C1, the color determining unit 122 optimizes the value of the G component, and then the value of the B component, thus optimizing the values for the RGB. In equation (2), argmin means a minimum operation point of the function, and equation (2) means r21, r22, and r23 where the function surrounded by a double line is minimum.

[Mathematical 2]

$$\operatorname*{argmin}_{r21,r22,r23} \left\| 3\begin{pmatrix} i_0 \\ i_1 \end{pmatrix} - \begin{pmatrix} 1 & r11 & r12 \\ r12 & r13 & 1 \end{pmatrix}\begin{pmatrix} r21 \\ r22 \\ r23 \end{pmatrix} \right\| \qquad \text{equation (2)}$$

wherein r11, r12, r13, r21, r22, r23: color values of color regions R11, R12, R13, R21, R22, R23, respectively, and $i_0$, $i_1$: color values of cells, of the first contents and the second contents, to be processed, respectively.

In the first process, the color determining unit 122 optimizes the color of each color region of the first cell C1. The evaluation function at this time returns a difference between the color obtained when the process-targeted pair of cells is observed with the light beam G1 in the first direction and with the light beam G2 in the second direction and the color of the first contents and the second contents, at the position of the process-targeted pair of cells. The color determining unit 122 optimizes the color of each color region in the first cell C1 so that the evaluation function returns a difference that is substantially small. In equation (2), the "3" for multiplying the color values of the first contents and the second contents is the number of color regions in the second cell C2.

In the second process, the color determining unit 122 gives a color optimized in the immediately preceding first process to the first cell C1, and optimizes the color of each color region of the second cell C2 so that the difference between the color of the process-targeted pair of cells observed with the light beam G1 in the first direction and the color of the first contents is small, and that the difference between the color of the process-targeted pair of cells observed with the light beam G2 in the second direction and the color of the second contents is small.

Figure 12:
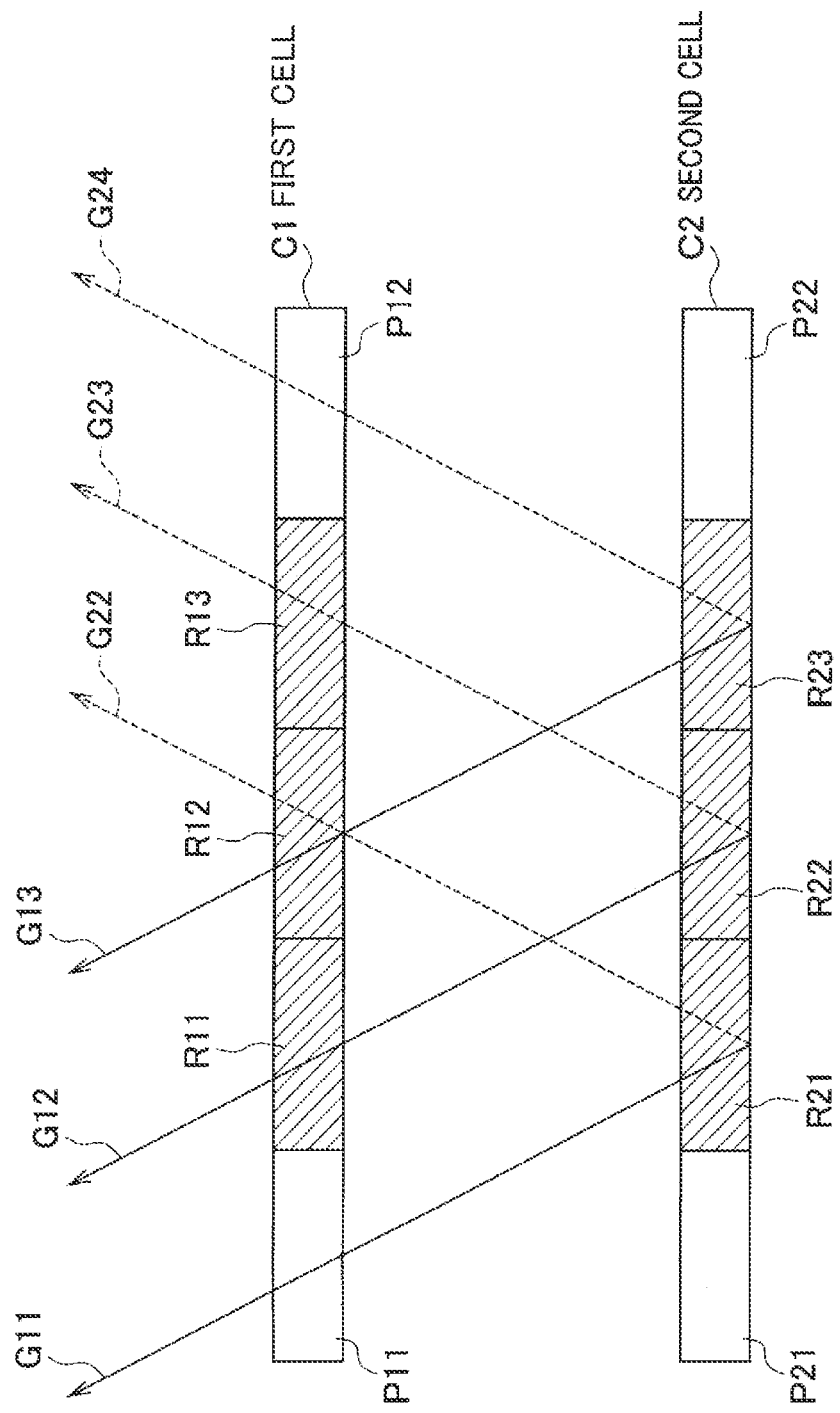
FIG. 12 is a diagram for explaining light to be considered in a second processing of the color determining unit.

In the second process, as shown in FIG. 12, the colors of the color regions of the second cell C2 are optimized from the colors of the light beams in predetermined directions passing through the color region R11, R12, R13 and the transparent regions P11 and P12, respectively, with the first cell C1 as a reference. In the second process, the color determining unit 122 considers the light beams G11, G12, and G13 of the first direction and the light beams G22, G23, and G24 of the second direction.

The color determining unit 122 optimizes the values of RGB color components of each color region of the second cell C2 by equation (3). For example, after optimizing the value of the R component of each color region of the second cell C2, the color determining unit 122 optimizes the value of the G component, and then the value of the B component, thus optimizing the values for the RGB.

[Mathematical 3]

$$\operatorname*{argmin}_{r11,r12,r13} \left\| 3\begin{pmatrix} i_0 \\ i_1 \end{pmatrix} - \begin{pmatrix} r22 & r23 & 1 \\ 1 & r21 & r22 \end{pmatrix}\begin{pmatrix} r11 \\ r12 \\ r13 \end{pmatrix} \right\| \qquad \text{equation (3)}$$

wherein r11, r12, r13, r21, r22, r23: color values of color regions R11, R12, R13, R21, R22, R23, respectively, and $i_0$, $i_1$: color values of cells, of the first contents and the second contents, to be processed, respectively.

In the second process, the color determining unit 122 optimizes the color of each color region of the second cell C2. As in the first process, the evaluation function at this time returns a difference between the color obtained when the process-targeted pair of cells is observed with the light beam G1 in the first direction and with the light beam G2 in the second direction and the color of the first contents and the second contents, at the position of the process-targeted pair of cells. The color determining unit 122 optimizes the color of each color region in the second cell C2 so that the evaluation function returns a smaller difference. In equation (3), the "3" for multiplying the color values of the first contents and the second contents is the number of color regions in the first cell C1.

Although equation (2) and equation (3) deal with the case where the first cell C1 has three color regions and the second cell C2 has three color regions, equation (4) and equation (5) enables optimization of each color region of each cell. Equation (4) is a generalization of equation (2), and equation (5) is a generalization of equation (3). Repeating equation (4) and equation (5) for each channel of RGB optimizes the color of each color region of the process-targeted pair of cells C in the first layer L1 and the second layer L2. The matrix rearranged according to the light beams in the directions in which the contents can be visually recognized is a matrix corresponding to the second term in the brackets of argmin in equation (2) and equation (3).

[Mathematical 4]

$$\operatorname*{argmin}_{B} \|qI - U_p B\| \qquad \text{equation (4)}$$

$$\operatorname*{argmin}_{U} \|qI - B_p U\| \qquad \text{equation (5)}$$

q: the total sum of the color regions

I: vector in which values of one channel of RGB at each of the positions of the first contents and the second contents are arranged U: value of one channel of RGB of the first cell B: value of one channel of RGB of the first cell $U_P$: matrix rearranged, with respect to the second cell, according to the light beams in the directions in which the contents can be visually recognized $B_P$: matrix rearranged, with respect to the first cell, according to the light beams in the directions in which the contents can be visually recognized Equation (4) and equation (5) can be solved by equation (6) and equation (7), respectively. To determine the color of each color region, in equation (6) and equation (7), an optimum value is obtained through [0,1]-constrained non-negative matrix factorization. In equation (6) and equation (7), T denotes a transposed matrix.

[Mathematical 5]

$$B_j \leftarrow B_j \frac{(U_p^T qI)_j}{(U_p^T U_p B)_j} \qquad \text{equation (6)}$$

$$U_j \leftarrow U_j \frac{(B_p^T qI)_j}{(B_p^T B_p U)_j} \qquad \text{equation (7)}$$

j: position of the element of the matrix

When solving equation (4), equation (6) is repeated until it converges by a multiplicative update. When solving equation (5), equation (7) is repeated until it converges by a multiplicative update. By alternately repeating equation (6) and equation (7) until they converge, the RGB values of each color region of the process-targeted pair of cells in the first layer L1 and the second layer L2 are determined.

(Input Image Value Changing Unit)

When the color values of the first contents and the second contents at the same position are different from each other, a ghost may appear in the sets of contents displayed by the display medium 1. The ghost means another image being superimposed and visually recognized on the original image to be displayed.

In view of the above, after the processing by the color determining unit 122, the input image value changing unit 123 changes the colors of the first contents and the second contents so that the colors of the first contents and the second contents at each position are brought close to each other, and the edges of the first contents and the second contents are brought close to each other. Human recognition tends to easily recognize a place where a color difference appears locally. Therefore, ghost is less likely recognized by reducing the difference in the overall colors of the sets of contents and the difference in the colors of the edge regions. Here, the "edge" refers to a portion having a large difference from a neighboring color, and specifically, is a region detected by a predetermined edge detection filter.

As illustrated in FIG. 13, the input image value changing unit 123 repeats step S201 until a predetermined terminating condition is satisfied. In step S201, the input image value changing unit 123 changes the colors of the first contents and the second contents so that the colors of the first contents and the second contents at each position are brought close to each other, and the edges of the first contents and the second contents are brought close to each other.

The input image value changing unit 123 changes the color values of the first contents and the second contents to values that hardly cause ghosts, with equation (8). Equation (8) is repeated for each channel of RGB.

[Mathematical 6]

$$\underset{s,o}{\text{argmin}}\ \beta\|(qIs+o)-U_pB\|+\gamma\|\Delta(qIs+o)-\Delta(U_pB)\| \quad \text{equation (8)}$$

Δ: characteristics of the first contents and the second contents
S: scaled image for adjusting contrasts
o: offset vector for adjusting overall brightness
β: weight for approaching targeted color
γ: weight for approaching to targeted color image The optimal s and o are determined by equation (8). From the equation (8), the optimum s and o are calculated, whereby the color values of the first contents and the second contents at the same position are brought close to each other and the image characteristics of the first contents and the second contents, more specifically, the characteristics of edges are brought close to each other.

When the optimum s and o are calculated, I' calculated from Is+o is output as the color values of the first contents and the second contents after the change by the input image value changing unit 123. The values of the contents changed by the input image value changing unit 123 are input to the color determining unit 122.

Note that, in equation (8), initial values are given to the color region of the second cell, and a matrix rearranged according to the light beam in the direction in which the contents is visually recognized with the second cell as the reference is used. However, calculation may be performed by giving initial values to the color region of the first cell, and using a matrix rearranged according to the light beam in the direction in which the contents is visually recognized with the first sell as the reference. Both methods converge to the same s and o.

The color at the position of the process-targeted pair of cells of the first contents and the color at the position of process-targeted pair of cells of the second contents, each of which color is changed by the input image value changing unit 123, are used to further processing by the color determining unit 122. With the processing by the input image value changing unit 123, the display medium 1 can display highly visually recognizable contents with ghosts hardly appearing.

With the display medium 1 related to the embodiment of the present disclosure as hereinabove described in which two layers having color regions are stacked, two sets of contents can be displayed by combinations of colors of color regions through which light beams in two directions pass. The display medium 1 can secure a larger amount of light and improve visibility as compared with a case of using a light shield to make color regions partially visually recognizable.

Other Embodiment

The present disclosure has been described above based on the above embodiments, variation, and the like. The description and drawings constituting part of this disclosure are not to be construed as limiting the present disclosure. Various alternative embodiments, examples, and operating techniques will become apparent to those skilled in the art from this disclosure.

For example, the processing device described in the above embodiment of the present disclosure may be configured on a single piece of hardware as shown in FIG. 8, or may be configured on a plurality of pieces of hardware according to the number of functions and processes. Further, the processing device may be implemented on an already existing processing device.

Needless to say, the present disclosure includes various embodiments that are not described herein. Therefore, the technical scope of the present disclosure is defined only by the matters specifying the disclosure according to the reasonable claims based on the above description.

DESCRIPTION OF REFERENCE CHARACTERS

1 Display Medium
100 Processing Device
110 Storage
111 First Input Image Value Data
112 Second Input Image Value Data
113 Color Region Data
120 Process Controller
121 Controller
122 Color Determining Unit
123 Input Image Value Changing Unit
B Reflective Substrate
C Cell
G Light Beam
H Transparent Member L Layer
T Transparent Layer

The invention claimed is:

1. A processing device configured to determine a color to be given to a process-targeted cell in a layer of a display medium capable of displaying different sets of contents with light beams in a plurality of directions,
wherein the display medium comprises a first layer and a second layer each having a color region to which a color is given, wherein the light beams in the plurality of directions are configured to display a plurality of sets of contents corresponding to the plurality of directions, on a basis of parts of the first layer and the second layer through which the light beams pass,
wherein the light beams in the plurality of directions include a first light beam in a first direction and a second light beam in a second direction,
wherein each layer of the first layer and the second layer comprises a transparent member, and each layer of the first layer and the second layer includes the color region and a transparent region to which no color is given,
wherein each light beam of the first light beam in the first direction and the second light beam in the second direction is configured to pass through the color region of at least one of the first layer and the second layer, and at least one of the first light beam in the first direction and the second light beam in the second direction is configured to pass through the color region of the first layer and the color region of the second layer,
wherein the first layer and the second layer are virtually divided into a plurality of cells, each cell of the plurality of cells has the color region and the transparent region, and the color region is positioned away from edges of each cell,
wherein the processing device comprises a process controller configured to:
execute a first process and a second process to determine a color of process-targeted cells of the first layer and the second layer;
in the first process, set initial color values to a process-targeted cell of the second layer, and optimize a color of a process-targeted cell of the first layer to configure:
a difference between a color observed with a first light beam in a first direction through the process-targeted cell of the first layer and a color of first contents small; and
a difference between a color observed with a second light beam in a second direction through the process-targeted cell of the second layer and a color of second contents small; and
in the second process, set the color optimized in the first process to the process-targeted cell of the first layer, and optimize a color of a process-targeted cell of the second layer to configure:
a difference between a color observed with the first light beam in the first direction through the process-targeted cell of the first layer and a color of the first contents small; and
a difference between a color observed with the second light beam in the second direction through the process-targeted cell of the second layer and a color of the second contents small.

2. The processing device of claim 1, wherein the process controller is further configured to:
set the color optimized in the second process to the process-targeted cell of the second layer and re-execute the first process; and
set the color optimized in the re-executed first process to the process-targeted cell of the first layer and re-execute the second process.

3. The processing device of claim 2, wherein the process controller is further configured to:
a change the color of the first contents and the color of the second contents to bring the color of the first contents and the color of the second contents close to each other and to bring an edge of the first contents and an edge of the second contents close to each other; and
use the color of the process-targeted cell for the first contents and the color of the process-targeted cell for the second contents.

4. A non-transitory computer-readable medium storing a processing program for causing the processing device to perform functions of the processing device of claim 2.

5. The processing device of claim 1, wherein the process controller is further configured to:
change the color of the first contents and the color of the second contents to bring the color of the first contents and the color of the second contents close to each other and to bring an edge of the first contents and an edge of the second contents close to each other; and
use the color of the process-targeted cell for the first contents and the color of the process-targeted cell for the second contents.

6. A non-transitory computer-readable medium storing a processing program for causing the processing device to perform functions of the processing device of claim 5.

7. A non-transitory computer-readable medium storing a processing program for causing the processing device to perform functions of the processing device of claim 1.

8. A processing device configured to determine a color to be given to a process-targeted cell in a layer of a display medium capable of displaying different sets of contents with light beams in a plurality of directions,
wherein the display medium comprises a first layer including at least a first color region and a first transparent region and a second layer including at least a second color region and a second transparent region, wherein
the light beams in the plurality of directions are configured to display a plurality of sets of contents corresponding to the plurality of directions, on a basis of parts of the first layer and the second layer through which the light beams pass,
the light beams in the plurality of directions include a first light beam in a first direction and a second light beam in a second direction,
the first layer includes a plurality of first cells, each first cell including at least the first color region and the first transparent region,
the second layer includes a plurality of second cells, each second cell including at least the second color region and the second transparent region,
the first light beam in the first direction passes through the first and second color regions of the corresponding first and second cells of the first and second layers, and
the second light beam in the second direction passes through the first color region of the first layer which the first light beam passes through, and passes through the second transparent region of the second layer, wherein the processing device comprises a process controller configured to:
  execute a first process and a second process to determine colors of process-targeted cells of the first and second layers;
  in the first process, set initial color values to a process-targeted cell of the second layer, and optimize a color of a process-targeted cell of the first layer to configure:
    a difference between a color observed with a first light beam in a first direction through the process-targeted cell of the first layer and a color of first contents small; and
    a difference between a color observed with a second light beam in a second direction through the process-targeted cell of the second layer and a color of second contents small; and
  in the second process, set the color optimized in the first process to the process-targeted cell of the first layer, and optimize a color of a process-targeted cell of the second layer to configure:
    a difference between a color observed with the first light beam in the first direction through the process-targeted cell of the first layer and a color of the first contents small; and
    a difference between a color observed with the second light beam in the second direction through the process-targeted cell of the second layer and a color of the second contents small.

* * * * *